United States Patent
Nishiyama

(10) Patent No.: US 12,112,502 B2
(45) Date of Patent: Oct. 8, 2024

(54) THREE-DIMENSIONAL MAP ESTIMATION APPARATUS AND OBSTACLE DETECTION APPARATUS

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Manabu Nishiyama, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 472 days.

(21) Appl. No.: 17/464,455

(22) Filed: Sep. 1, 2021

(65) Prior Publication Data

US 2022/0343536 A1 Oct. 27, 2022

(30) Foreign Application Priority Data

Apr. 21, 2021 (JP) ................. 2021-071762

(51) Int. Cl.
| | |
|---|---|
| G06T 7/73 | (2017.01) |
| G01S 13/89 | (2006.01) |
| G06V 20/58 | (2022.01) |
| G08G 1/16 | (2006.01) |
| H04N 23/90 | (2023.01) |
| B60W 30/095 | (2012.01) |

(52) U.S. Cl.
CPC ............... *G06T 7/74* (2017.01); *G01S 13/89* (2013.01); *G06V 20/58* (2022.01); *G08G 1/166* (2013.01);
(Continued)

(58) Field of Classification Search
CPC .. G06T 7/20; G06T 7/292; G06T 7/73; G06T 7/97; G06T 2207/30244;
(Continued)

(56) References Cited

U.S. PATENT DOCUMENTS

2010/0220189 A1 9/2010 Yanagi
2014/0267608 A1 9/2014 Dhome
(Continued)

FOREIGN PATENT DOCUMENTS

JP 2009132259 A 6/2009
JP 4760831 B2 8/2011
(Continued)

OTHER PUBLICATIONS

Danping Zou et al., CoSLAM: Collaborative Visual SLAM in Dynamic Environments, IEEE Transactions on Pattern Analysis and Machine Intelligence, US, IEEE, published May 1, 2012, vol. 35, No. 2, Feb. 2013, pp. 354-366.

(Continued)

*Primary Examiner* — Andrew W Johns
(74) *Attorney, Agent, or Firm* — Kim & Stewart LLP

(57) ABSTRACT

According to one embodiment, a three-dimensional map estimation apparatus includes a processor that selects an imaging apparatus from a plurality of imaging apparatuses and then estimates a position and orientation for a moving object on which the selected imaging apparatus is mounted based on images captured by the selected imaging apparatus. The processor outputs a first position and orientation estimation result for the moving object based on images from selected imaging apparatuses. The processor calculates a second position and orientation estimation result indicating an estimated position and orientation for the moving object using the first position and orientation estimation result. The processor estimates a three-dimensional map for the surroundings of the moving object based on the second position and orientation estimation result.

20 Claims, 6 Drawing Sheets

(52) U.S. Cl.
CPC ......... *H04N 23/90* (2023.01); *B60W 30/0956* (2013.01); *B60W 2420/403* (2013.01); *B60W 2554/4029* (2020.02); *G06T 2207/30244* (2013.01); *G06T 2207/30261* (2013.01)

(58) Field of Classification Search
CPC .......... G06T 2207/30261; G06V 20/58; G05D 1/0231; G05D 1/0246; G05D 1/0251; G05D 1/0253; G01C 21/005; G01C 21/3804
See application file for complete search history.

(56) References Cited

U.S. PATENT DOCUMENTS

| | | | |
|---|---|---|---|
| 2017/0236301 A1* | 8/2017 | Kobayashi et al. | ... H04N 23/64 382/103 |
| 2018/0115711 A1 | 4/2018 | Kato et al. | |
| 2018/0286056 A1 | 10/2018 | Kaino et al. | |
| 2020/0012877 A1* | 1/2020 | Kotake et al. | ............ G06T 7/73 |
| 2021/0027486 A1 | 1/2021 | Kaino | |

FOREIGN PATENT DOCUMENTS

| | | |
|---|---|---|
| JP | 2015501471 A | 1/2015 |
| JP | 2016197083 A | 11/2016 |
| JP | 6425405 B2 | 11/2018 |
| WO | 2015015542 A1 | 2/2015 |
| WO | 2017057054 A1 | 4/2017 |
| WO | 2019188391 A1 | 10/2019 |

OTHER PUBLICATIONS

Japanese Office Action dated May 21, 2024, mailed in counterpart Japanese Application No. 2021-071762, 10 pages (with translation).
Japanese Office Action dated Aug. 6, 2024, mailed in counterpart Japanese Application No. 2021-071762, 10 pages (with translation).

* cited by examiner

THREE-DIMENSIONAL MAP ESTIMATION APPARATUS AND OBSTACLE DETECTION APPARATUS

CROSS-REFERENCE TO RELATED APPLICATION

This application is based upon and claims the benefit of priority from Japanese Patent Application No. 2021-071762, filed Apr. 21, 2021, the entire contents of which are incorporated herein by reference.

FIELD

Embodiments described herein relate generally to a three-dimensional map estimation apparatus and an obstacle detection apparatus.

BACKGROUND

There is a technology for estimating position and orientation (posture) of a vehicle by using a camera mounted on the vehicle and then estimating a three-dimensional map of the surroundings. For example, visual simultaneous localization and mapping (SLAM) can be used for estimating the position and orientation of the vehicle or the like.

Accuracy of position and orientation estimation is important for estimating the three-dimensional map. However, the accuracy of position and orientation estimation may be reduced due to motion of the vehicle on which the camera is mounted or motion of an object imaged by the camera. Furthermore, when the article imaged by the camera is far away, the motion is small, and thus, many frames may be required in the position and orientation estimation to detect the motion.

DETAILED DESCRIPTION

Figure 1:
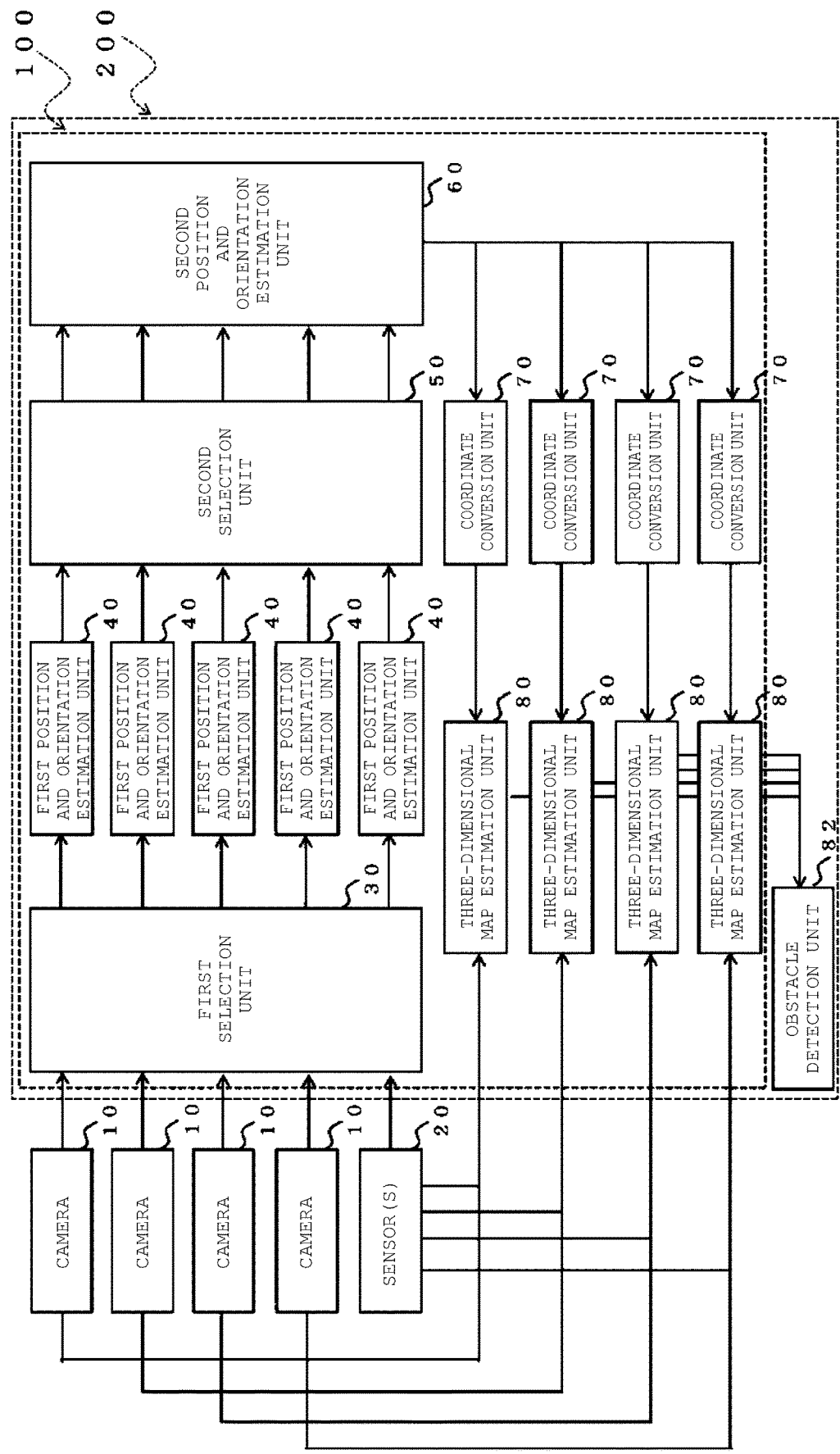
FIG. 1 is a block diagram illustrating aspects of a three-dimensional map estimation apparatus and an obstacle detection apparatus according to a first embodiment.

Embodiments provide a three-dimensional map estimation apparatus and an obstacle detection apparatus that increase the accuracy of position and orientation estimation.

In general, according to one embodiment, a three-dimensional map estimation apparatus includes a processor. The processor is configured to select an imaging apparatus from a plurality of imaging apparatuses, then estimate a position and orientation for a moving object on which the selected imaging apparatus is mounted. The position and orientation for the moving object is estimated based on images captured by the selected imaging apparatus and then output as a first position and orientation estimation result; calculate a second position and orientation estimation result indicating an estimated position and orientation for the moving object, the second position and orientation estimation result being calculated using the first position and orientation estimation result; and estimate a three-dimensional map for the surroundings of the moving object based on the second position and orientation estimation result.

Hereinafter, certain example embodiment of the present disclosure will be described with reference to the drawings. In the description, common reference numerals are given to common parts throughout the drawings. The example embodiments do not limit the present disclosure.

First Embodiment

Example of Functional Configuration of Three-Dimensional Map Estimation Apparatus 100 and Obstacle Detection Apparatus 200

The three-dimensional map estimation apparatus 100 and the obstacle detection apparatus 200 according to the first embodiment will be described with reference to FIG. 1. FIG. 1 is a block diagram illustrating aspects of the three-dimensional map estimation apparatus 100 and the obstacle detection apparatus 200.

The three-dimensional map estimation apparatus 100 estimates a three-dimensional map of the surroundings of a moving object using cameras 10 mounted inside and outside the moving object. The moving object may be an automobile or the like. A sensor 20 (or sensors 20) which is a sensor types other than a camera may also be used in estimating the three-dimensional map. The obstacle detection apparatus 200 detects an obstacle 2 based on the three-dimensional map provided by the three-dimensional map estimation apparatus 100. The three-dimensional map estimation apparatus 100 includes a first selection unit 30 connected to the cameras 10 and the sensor 20, several first position and orientation estimation units 40, a second selection unit 50, a second position and orientation estimation unit 60, several coordinate conversion units 70, and several three-dimensional map estimation units 80.

The obstacle detection apparatus 200 includes an obstacle detection unit 82 in addition to the three-dimensional map estimation apparatus 100.

In the following description, a case where the cameras 10 and at least one sensor 20 (other than a camera) are mounted on a vehicle 1 (e.g., an automobile) will be described. In other examples, the cameras 10 and the sensors 20 can be mounted s on a robot, a drone, or the like to estimate a three-dimensional map of surroundings and to detect the obstacle 2.

In the present disclosure, the position of the vehicle 1 being estimated/calculated may be an absolute position or may be a relative position based on a certain specific reference point.

Furthermore, in the present disclosure, the obstacle 2 is an object with a height from a reference point is greater than a threshold. For example, the threshold is set based on a shortest vertical distance from a road surface to the lowest part of a vehicle body taking the road surface as a reference point. An object that does not exceed the threshold can be excluded from a detection target of the obstacle 2 as an object that will not collide with the vehicle 1 while the vehicle 1 travels. The threshold is not limited to a height and the obstacle 2 may be set according to the size of an object in a horizontal direction.

Figure 2:
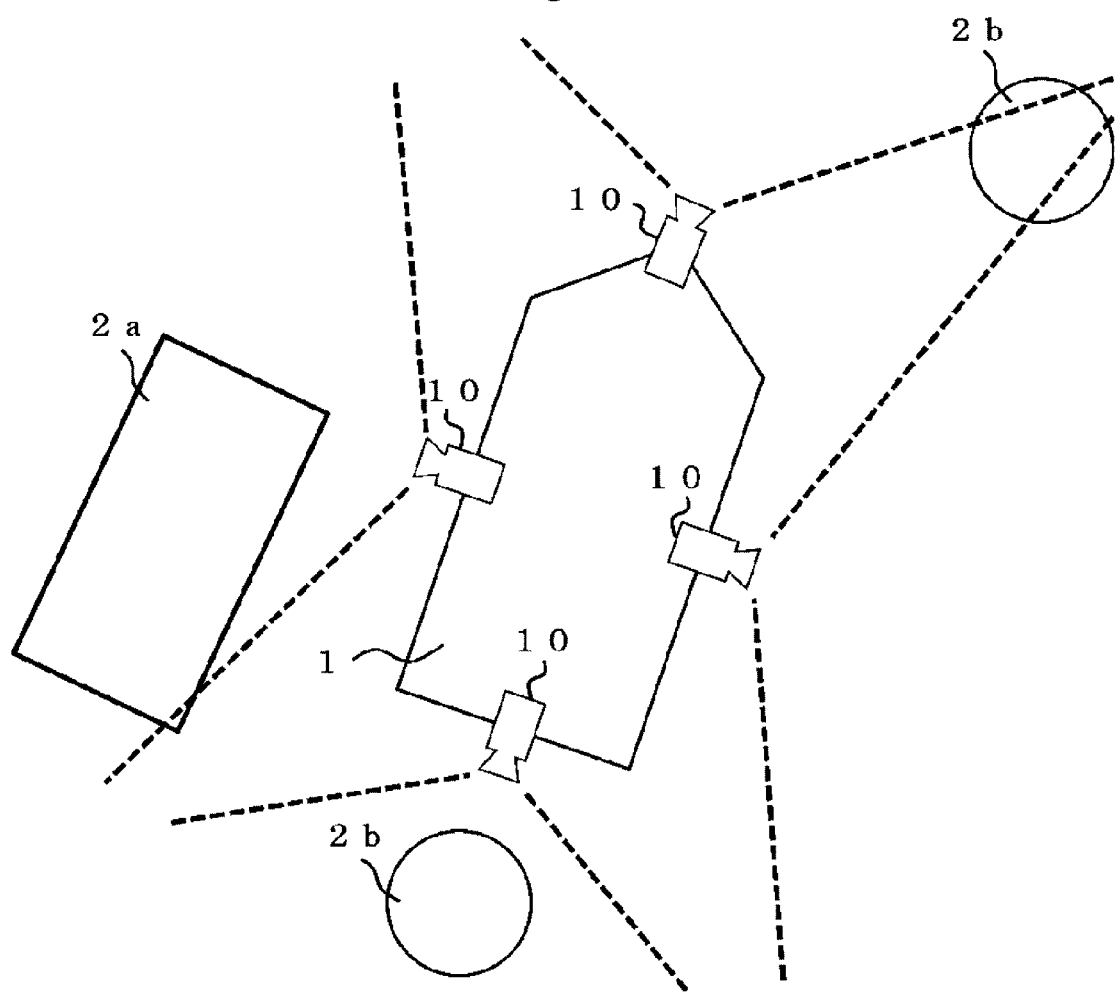
FIG. 2 is a top view illustrating an arrangement of cameras attached to a vehicle.

As illustrated in FIG. 2, a plurality of cameras 10 are provided on the vehicle 1. For example, a camera 10 is provided on each of the front, rear, left, and right of the vehicle 1. A sensor 20 can be, for example, an ultrasonic sensor, a laser distance sensor (e.g., LIDAR), a speed sensor, an angular velocity sensor, or the like. Such sensors 20 can be provided inside or outside the vehicle 1 as appropriate.

The cameras 10 and the sensors 20 acquire images and sensor information at a certain times.

The first selection unit 30 selects a camera 10 and a sensor 20 for estimating position and orientation of the vehicle 1 from among the plurality of cameras 10 and the sensors 20. In particular, the first selection unit 30 selects the camera 10 and the sensor 20 that will increase accuracy of a position and orientation estimation by using a selection method described below.

The first position and orientation estimation units 40 each individually estimate position and orientation based on an image of the camera 10 selected by the first selection unit 30 and sensor information acquired by the sensor 20 and provide first position and orientation estimation results. The first position and orientation estimation units 40 estimate position and orientation of the vehicle 1 from the image of the camera 10 selected by the first selection unit 30 and information of the sensor 20 by using, for example, a technology of visual SLAM.

In the present embodiment, the first position and orientation estimation units 40 are provided corresponding to each of the cameras 10 and at least one sensor 20. That is, five (5) first position and orientation estimation units 40 are provided in this example. This is to further increase accuracy of a second position and orientation estimation result in a subsequent three-dimensional map estimation.

In FIG. 1, the first position and orientation estimation units 40 are depicted separately, but the first position and orientation estimation units 40 can be configured as one block in other examples. In such other examples, the position and orientation estimation processing corresponding to each camera 10 may be performed individually according to an input signal from the first selection unit 30.

The second selection unit 50 calculates a similarity value for the first position and orientation estimation results from the plurality of first position and orientation estimation results provided by the plurality of first position and orientation estimation units 40. The second selection unit 50 selects one or more first position and orientation estimation results based on the similarity value. For example, one or more other first position and orientation estimation results can be selected while an outlier (substantially different) first position and orientation estimation result may be excluded.

The second position and orientation estimation unit 60 obtains the second position and orientation estimation result for the vehicle 1 as a weighted sum of the one or more first position and orientation estimation results selected by the second selection unit 50.

Each coordinate conversion unit 70 converts (or translates) a motion of one camera 10 into a motion of another camera 10. As an example in which correction is necessary, an image acquired by a camera 10 not selected by the first selection unit 30 and the second selection unit 50 may be used for a subsequent three-dimensional map estimation. Since the first position and orientation estimation results or the second position and orientation estimation result cannot be obtained from an image acquired by the camera 10 not selected by the first selection unit 30 or the second selection unit 50, it is necessary to obtain a change in position and orientation of this non-selected camera 10 from the change in position and orientation of another camera 10. Thus, when the vehicle 1 turns, the center of the turn is located near the center of a rear wheel axle of the vehicle 1. Since the cameras 10 have different distances from the center of the turn, a magnitude of a motion due to the turn is different. Therefore, for example, it is necessary to convert a change in the position and orientation of the camera 10 provided in the front of the vehicle 1 into a change in the position and orientation of the camera 10 provided in the rear of the vehicle 1. The change in the position and orientation of the camera 10 can be represented by a matrix representing a rotation and a vector representing translation (parallel movement). Each coordinate conversion unit 70 can linearly convert a rotation matrix and a translation vector of one camera 10 to obtain a rotation matrix and a translation vector of another camera 10. This conversion by each coordinate conversion unit 70 may not need to be performed after the second position and orientation estimation unit 60 calculates the second position and orientation estimation results. This is because images acquired by the camera 10 that is not selected by the first selection unit 30 and the second selection unit 50 is used.

Each three-dimensional map estimation unit 80 estimates a three-dimensional map of the surroundings of the vehicle 1 by using the second position and orientation estimation result for the vehicle 1 and feature points between images at acquired at different times by the cameras 10. Each three-dimensional map estimation unit 80 calculates distances between the vehicle 1 and the feature points from a positional relationship between the same feature points in the images at different times from the motion of the cameras 10 by using a principle of triangulation and thus estimate a three-dimensional map.

Furthermore, as described above, the three-dimensional map is obtained by using the feature points of the images of the cameras 10. When the images of the cameras 10 have few feature points or do not have any feature points, density of the three-dimensional map is reduced. Therefore, the feature points to be used can be increased by also inputting the images acquired by the cameras not selected by the first selection unit 30 into the three-dimensional map estimation units 80. Thereby, a denser three-dimensional map can be estimated.

Likewise, a three-dimensional map may be estimated by using an image used for calculating the first position and orientation estimation results but not selected (that is, an image that was excluded) by the second selection unit 50. The three-dimensional map estimation units 80 may also receive external sensor information capable of providing distance information, for example, external sensor information acquired by the ultrasonic sensor or the laser distance sensor and estimate a three-dimensional map around the vehicle 1 accordingly.

The obstacle detection unit 82 detects an obstacle 2 based on travel information (such as a travel direction and a speed) of the vehicle 1 and the three-dimensional map calculated by the three-dimensional map estimation units 80. The detection result is output to, for example, an alarm apparatus or the like to alert a driver of the presence of an obstacle 2.

Example of Processing by Three-Dimensional Map Estimation Apparatus 100 and Obstacle Detection Apparatus 200

Figure 3:
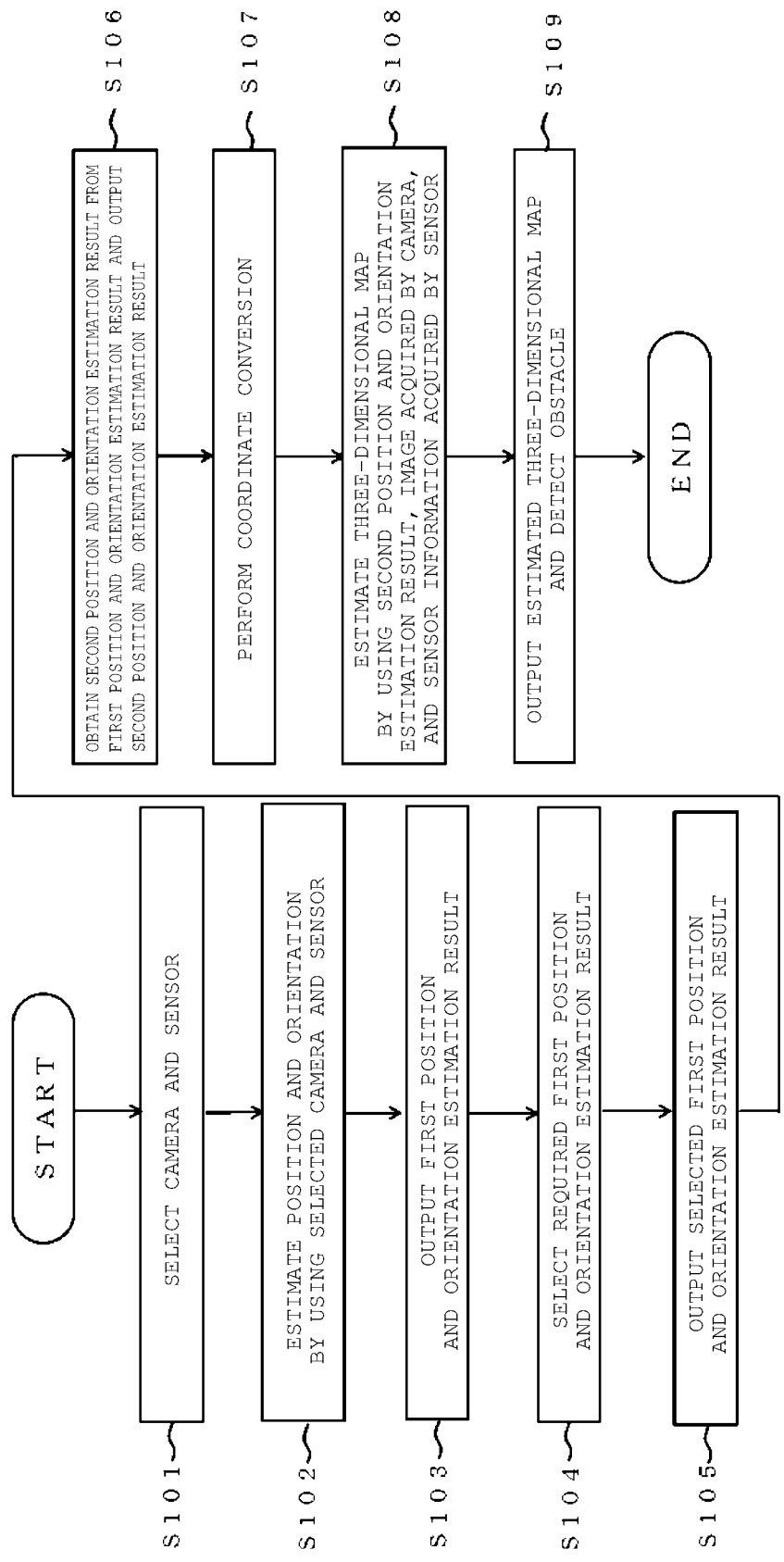
FIG. 3 is a flowchart of processing in a three-dimensional map estimation apparatus and an obstacle detection apparatus according to a first embodiment.

A process flow of the three-dimensional map estimation apparatus 100 and the obstacle detection apparatus 200 will be described with reference to FIG. 3. FIG. 3 is a flowchart illustrating the process flow of the three-dimensional map estimation apparatus 100 and the obstacle detection apparatus 200 according to the first embodiment.

Step S101

In step S101, the first selection unit 30 selects one or more camera(s) 10 and/or sensor(s) 20 to be used for a position and orientation estimation such that accuracy of a position and orientation estimation for the vehicle 1 will be high.

The first selection unit 30 compares, for example, an image acquired at time t2 to an image acquired at time t1 (which is a time after the time t2) and selects one or more cameras 10 and sensors 20 having an appropriate amount of change in movement of an object in the image.

For example, the camera(s) 10 and/or the sensor(s) 20 having an appropriate amount of change in movement of an object between images at different times can be selected based on a positional relationship between the vehicle 1 and a surrounding obstacle (object). The first selection unit 30 selects the camera 10 which is at a distance between previously determined first and second thresholds for a distance between the vehicle 1 and the obstacle 2. The distance between the camera 10 and the obstacle 2 can be acquired from the three-dimensional map based on an image acquired at the time t2 and sensor information. That is, a camera 10 at a position for which the distance to the obstacle 2 is not too large and not too small is selected.

The camera(s) 10 and/or the sensor(s) 20 may be selected based on a speed (vehicle speed) of the vehicle 1. In FIG. 2, for example, when the vehicle 1 turns to the left, the amount movement in images of obstacle 2a provided by the camera 10 on the left of the vehicle 1 at different times is reduced. On the other hand, the amount movement in images of an obstacle 2b provided by the cameras 10 at the front and rear of the vehicle 1 at different times is increased. In this case, a threshold for the vehicle speed may be preset. When the vehicle speed is less than or equal to the threshold, the first selection unit 30 selects the cameras 10 mounted on the left and right of the vehicle 1 if the vehicle 1 traveling straight but selects the cameras 10 mounted in the front and rear of the vehicle 1 if turning (deviating from a straight path). If the vehicle speed is greater than the threshold, then the cameras 10 mounted in the front and rear of the vehicle 1 are selected.

Other moving objects, such as pedestrians, can be detected by pattern recognition, and the camera(s) 10 with less moving objects may be selected. Since the visual SLAM technique performs a position and orientation estimation and a three-dimensional map estimation on the premise that an object in an image from a camera 10 is stationary, the less movement of objects in the field of view, the higher the accuracy.

When a three-dimensional map is estimated by using an image at time t3 (see, e.g., FIG. 5) at which the camera 10 first acquires an image, there is not yet a three-dimensional map based on the image acquired at the time t3 and sensor information. Therefore, the first selection unit 30 selects a camera 10 based on a vehicle speed, an angular velocity, and presence or absence of other moving objects at the time t2 (after time t3).

Step S102

In step S102, a position and orientation estimation for the vehicle 1 is performed using images from each of the selected camera(s) 10 (and/or sensor results from sensor(s) 20). The selected cameras 10 (selected in step S101) respectively provide images to a corresponding one of the first position and orientation estimation units 40. Likewise, the sensor(s) 20 provide sensor information (results/readings) to a first position and orientation estimation units 40 when selected by the first selection unit 30.

Figure 4:
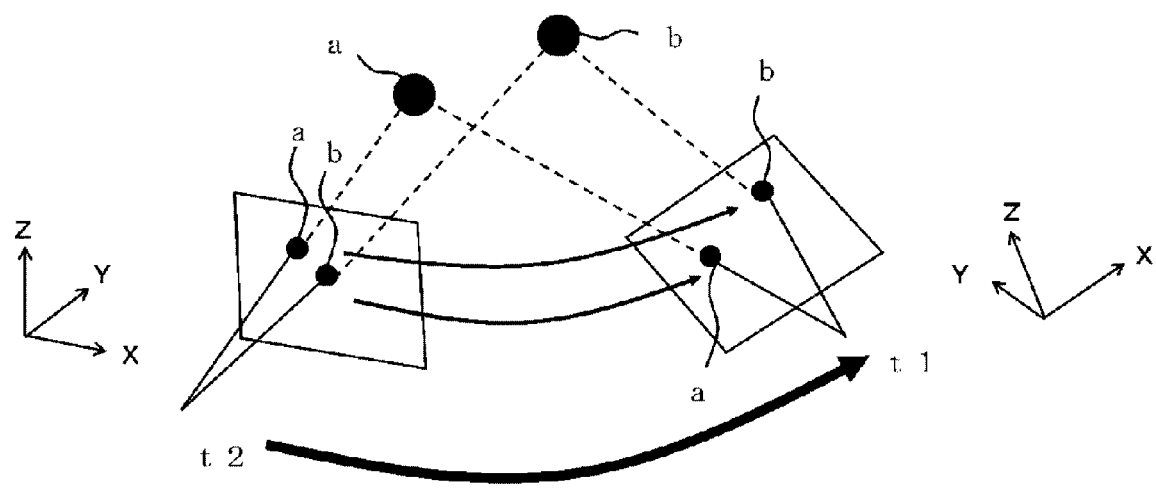
FIG. 4 is a view illustrating a method of estimating position and orientation by using visual SLAM.

Among methods that can be used for estimating the position and orientation of the vehicle 1 at the time t1, a method of using the visual SLAM process will be described with reference to FIG. 4.

In this process, the first position and orientation estimation unit(s) 40 first acquire images taken/acquired at the times t2 and t1 from the camera(s) 10 selected by the first selection unit 30. Next, two or more feature point groups are extracted for respective images at the times t2 and t1. The feature point groups extracted at the times t2 and t1 are matched with each other, and a correspondence relationship between the feature points at times t2 and t1 is obtained. For the matching between the feature point groups in different images acquired at different time, similarity values and the like calculated by using normalized cross-correlation (NCC) or the like for an image pattern around the feature points can be used. From motion of the correlated feature point pair, a change in the position and orientation of the vehicle 1 from the time t2 to the time t1 can be estimated.

First position and orientation estimation results are correlated with a translational motion (three-dimensional) and a rotational motion (three-dimensional) of the vehicle 1 from the time t2 to the time t1, and thus six-dimensional first position and orientation estimation results are obtained.

Step S103

In step S103, the first position and orientation estimation unit 40 outputs the six-dimensional first position and orientation estimation results calculated in step S102 to the second selection unit 50.

Step S104

In step S104, the second selection unit 50 obtains similarity values for the first position and orientation estimation results for the respective selected cameras 10 based on the output result in step S103. Thereafter, the second selection unit 50 selects one or more first position and orientation estimation results based on the obtained similarity values. For example, first position and orientation estimation results are selected so as to exclude first position and orientation estimation results having deviated values (non-similar values) with respect to the other results.

The similarity value is obtained by comparing, for example, translation vectors representing translational motions of the respective cameras 10 and using an inner product of the vectors. Similarity between rotational motions is likewise defined, and this similarity may also be used.

Step S105

In step S105, the one or more first position and orientation estimation results selected by the second selection unit 50 in step S104 are output to the second position and orientation estimation unit 60.

Step S106

In step S106, the second position and orientation estimation unit 60 provides a second position and orientation estimation result for vehicle 1 using all the first position and orientation estimation results output in step S105 and then outputs the second position and orientation estimation result to the coordinate conversion unit 70. Thereby, a change in position and orientation of the vehicle 1 from the time t2 (initial time) to the time t1 (later time) is estimated.

The second position and orientation estimation result in this example is a weighted sum of the different first position and orientation estimation results used as inputs to the second position and orientation estimation unit 60. For example, a reliability related value for each first position and orientation estimation results can be calculated by the second position and orientation estimation unit 60, and then a weighting coefficient applied for each of the first position and orientation estimation results according to the reliability related value. As an example of a reliability related value, there is a magnitude of variation in a distribution of feature points in a three-dimensional space. When the reliability is high, the magnitude of the variation in the distribution of feature points is increased. When the variation in the distribution of feature points in the three-dimensional space is small, a distance between the camera 10 and the feature points can be accurately calculated for part of the feature points in step S108, but a distance between the camera 10 and the feature points in the remaining part cannot be accurately calculated, and thus, accuracy of a three-dimensional map estimation is reduced. Therefore, the reliability of a first position and orientation estimation result with a large variation in the distribution of feature points in the three-dimensional space is high. Furthermore, there are also methods such as increasing the reliability value as the number of matched feature point pairs increases and increasing the reliability value as an average value of similarity of the matched feature point pairs increases.

Step S107

In step S107, the coordinate conversion unit 70 calculates a change in position and orientation of each of the cameras 10 by performing a coordinate conversion on the second position and orientation estimation result.

Step S108

In step S108, the present three-dimensional coordinates of feature points are calculated from the change in position and orientation of each of the cameras 10 calculated in step S107 and a corresponding relationship between the feature points at the times t2 and t1. A three-dimensional point group for which the coordinate values have been calculated is output as a three-dimensional map of the surroundings of the vehicle 1.

A method of estimating the three-dimensional map with a camera 10 by using the visual SLAM processing will be described with reference to FIG. 4. Three-dimensional positions of feature point a are estimated based on a principle of triangulation by using corresponding feature points "a" in images at each of time t2 and time t1 extracted in step S102 and the change in the position and orientation of the camera 10 output in step S107.

The three-dimensional map estimation unit 80 also obtains correspondence relationships between feature points for the cameras 10 not selected by the first selection unit 30 and the second selection unit 50 and estimates three-dimensional positions of various feature points in images acquired by such cameras 10 by using the changes in the positions and orientations of the respective cameras 10 calculated in step S107.

Step S109

In step S109, at least one three-dimensional maps estimated in step S108 is output to the obstacle detection unit 82.

In addition, a threshold for distances between the vehicle 1 and feature points (obstacles) is set. When the distance between the vehicle 1 and a feature point is less than or equal to the threshold, it is determined that there is the obstacle 2.

Figure 5A:
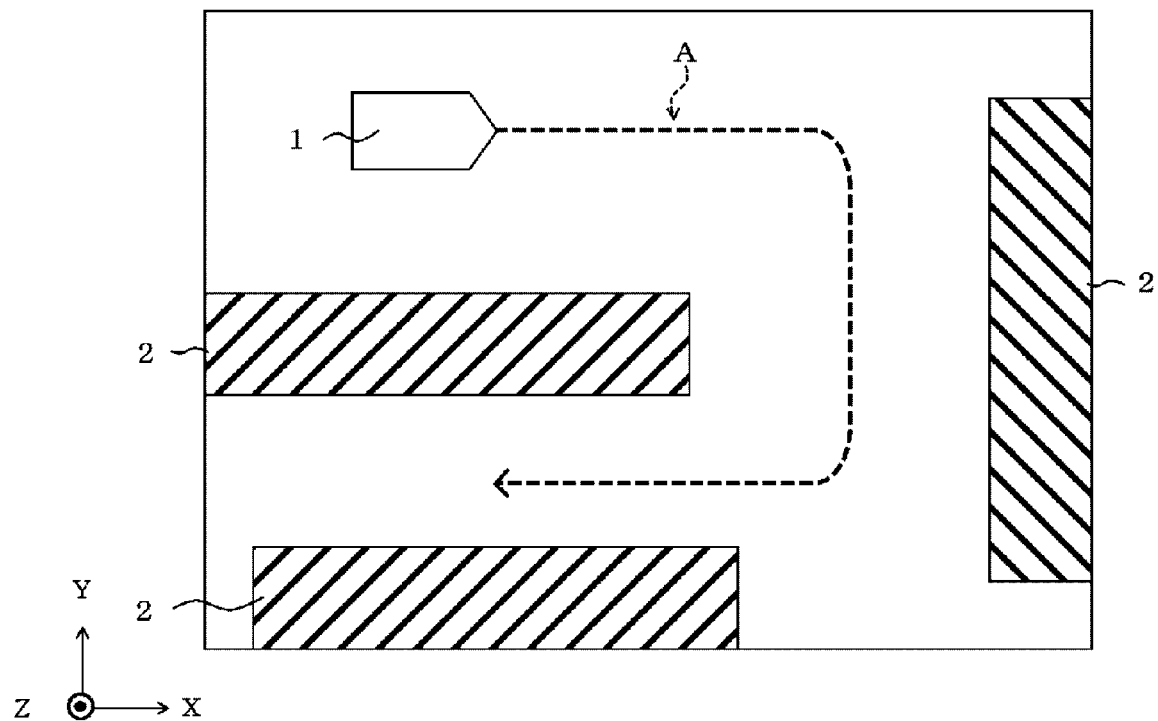
FIG. 5A is a view illustrating an example of a certain environment of an obstacle.
Figure 5B:
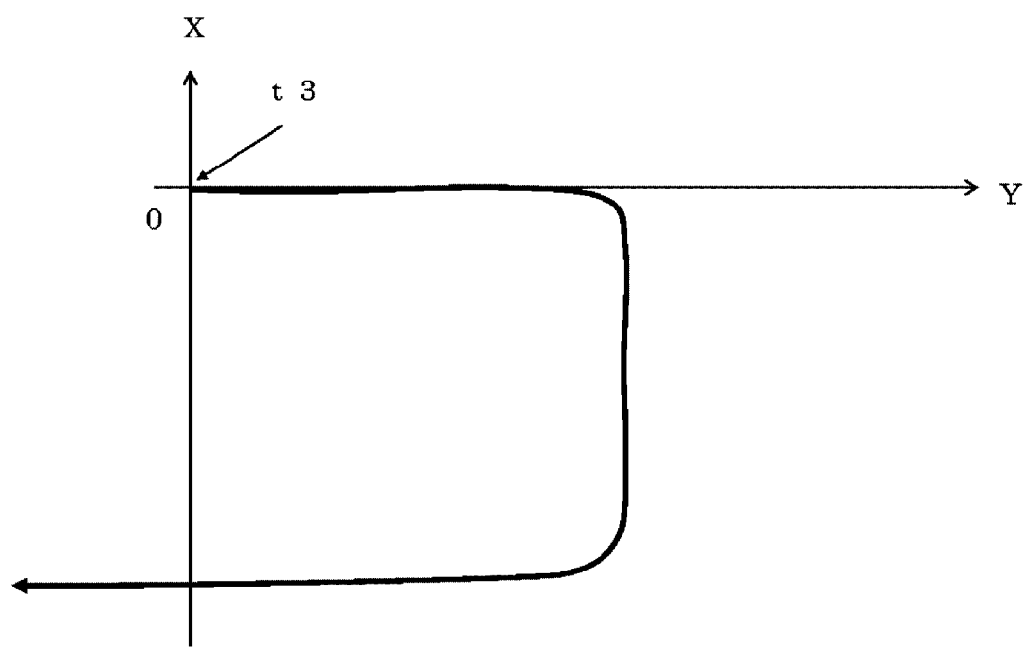
FIG. 5B is a diagram illustrating an example of a travel locus of a vehicle when the vehicle travels in the environment illustrated in FIG. 5A.

FIGS. 5A and 5B depict an experimental result obtained when a vehicle 1 travelled in an environment with obstacles 2. FIG. 5A is an example of an environment with obstacles 2 therein, and FIG. 5B illustrates an example of a travel locus of the vehicle 1 when the vehicle 1 travelled on a route of a line A in the environment illustrated in FIG. 5A.

The vehicle 1 travels within an environment in which a plurality of the obstacles 2 are provided as illustrated in FIG. 5A. When step S101 to step S106 are performed at multiple times and second position and orientation estimation results are output for each time and plotted on a graph, a travel locus of the vehicle 1 can be obtained as illustrated in FIG. 5B. In FIGS. 5A and 5B, the possible travel directions of the vehicle 1 are in the XY plane, and the height direction of the vehicle 1 is set as the Z direction. Although the second position and orientation estimation results are output in three dimensions, in the example of the travel locus of the vehicle 1 illustrated in FIG. 5B, the second position and orientation estimation results in the Z direction are omitted. In FIG. 5B, the travel locus of the vehicle 1 is also illustrated by setting a departure position of the vehicle 1 as a starting point 0.

Effects of First Embodiment

The three-dimensional map estimation apparatus 100 and the obstacle detection apparatus 200 according to the first embodiment are provided with the first selection unit 30 for selecting the cameras 10 to be used for estimating position and orientation of the vehicle 1 along with a sensor 20. The three-dimensional map estimation apparatus 100 and the obstacle detection apparatus 200 according to the first embodiment can also use sensor information from a sensor 20 in addition to an image acquired by the camera 10 in order to estimate the position and orientation of the vehicle 1. The three-dimensional map estimation apparatus 100 and the obstacle detection apparatus 200 according to the first embodiment also perform estimation by using images acquired by the cameras 10 that were not selected by the first selection unit 30 and/or the second selection unit 50 and/or other sensor information from a sensor 20 in order to estimate a three-dimensional map. Thereby, the present embodiment has at least two beneficial effects.

According to a first effect, a position and orientation estimation of the vehicle 1 can be made more stable and accurate. The first selection unit 30 selects a camera(s) 10 or a sensor(s) 20 having an appropriate amount of movement of an object between images acquired at different times. When the amount of movement of the object between the different images is less than one pixel, accuracy of the position and orientation estimation is reduced. However, since the first selection unit 30 selects those camera 10 and sensor 20 having an appropriate amount of movement of the object between the different images, it can be expected that the accuracy of the position and orientation estimation of the vehicle 1 will be increased.

According to a second effect, it is possible to reduce the number of situations in which a three-dimensional map estimation cannot be performed. The three-dimensional map estimation apparatus 100 and the obstacle detection apparatus 200 according to the first embodiment can also perform a position and orientation estimation by also using sensor information acquired by a sensor 20 in addition to the camera 10. Thereby, for example, even when it is difficult to perform the position and orientation estimation using an image from a camera 10 such as immediately after the vehicle 1 starts to move, the position and orientation estimation can still be performed. Since a three-dimensional map estimation uses a second position and orientation estimation result, it is possible to reduce the number of situations where the three-dimensional map estimation cannot be performed at all.

The three-dimensional map estimation apparatus 100 and the obstacle detection apparatus 200 according to the first embodiment perform the by also using images acquired by the cameras 10 that were not selected by the first selection unit 30 and sensor information from sensor(s) 20. Likewise, any image used for calculating a position and orientation estimation result but not subsequently selected by the second selection unit 50 is also used for three-dimensional map estimation.

As described above, the three-dimensional map estimation using visual SLAM is performed based on the second position and orientation estimation result and the feature points of an image acquired by a camera 10. Therefore, when accuracy of the estimation of a change in position and orientation is reduced, accuracy of the three-dimensional map estimation is reduced. The three-dimensional map estimation apparatus 100 and the obstacle detection apparatus 200 according to the first embodiment select the camera(s) 10 and the sensor(s) 20 permitting an accurate calculation of a change in position and orientation and estimate a three-dimensional map based on the selected camera(s) 10 and sensor(s) 20, and thus, even the unselected cameras 10 can be expected provide an estimated three-dimensional map with higher accuracy.

Implementation Example of Three-Dimensional Map Estimation Apparatus 100 and Obstacle Detection Apparatus 200

Figure 6:
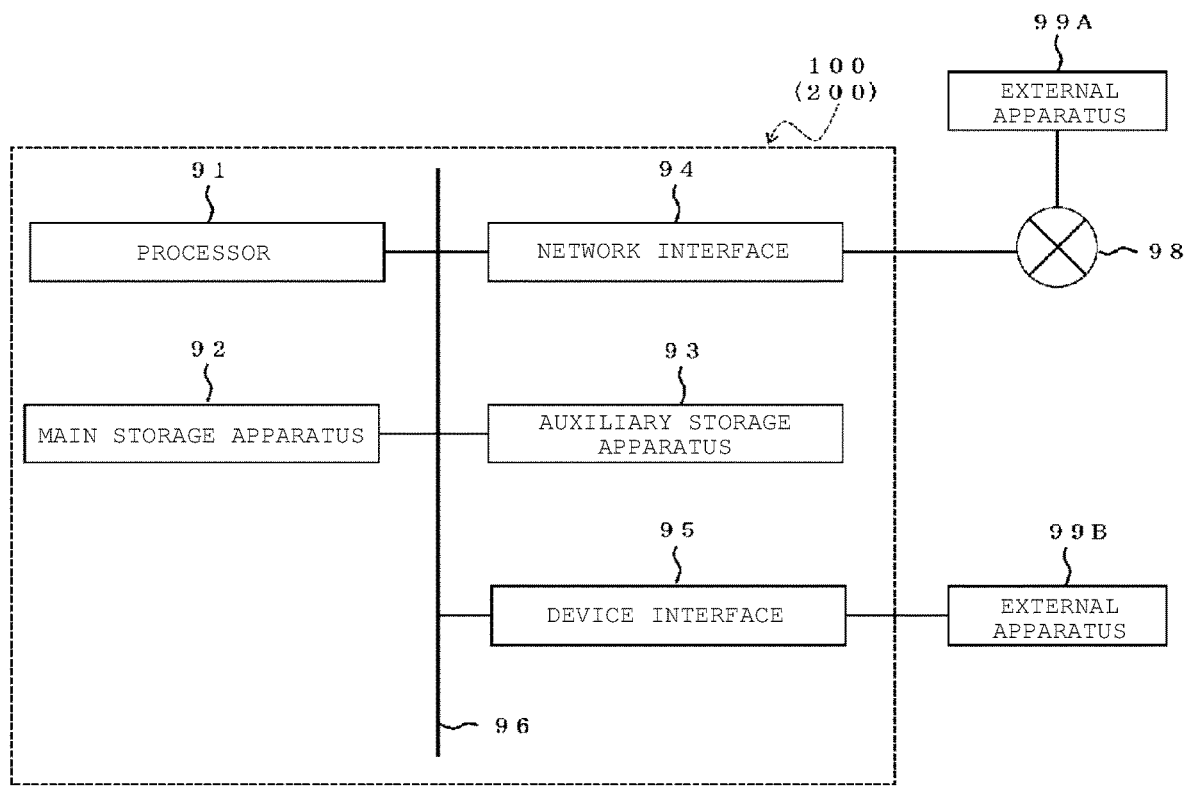
FIG. 6 is a diagram illustrating an implementation example of a three-dimensional map estimation apparatus and an obstacle detection apparatus according to a first embodiment.

FIG. 6 is a block diagram illustrating an example of hardware implementation of a three-dimensional map estimation apparatus 100 and an obstacle detection apparatus 200 according to the first embodiment. An example of a three-dimensional map estimation apparatus 100 will be described, but the three-dimensional map estimation apparatus 100 may be replaced with an obstacle detection apparatus 200 or may be mounted in the obstacle detection apparatus 200.

The three-dimensional map estimation apparatus 100 includes a processor 91, a main storage apparatus 92, an auxiliary storage apparatus 93, a network interface 94, and a device interface 95. The components are connected by a bus 96. The three-dimensional map estimation apparatus 100 may be an independent computer apparatus or may be an accelerator incorporated into or connected to a computer apparatus.

The three-dimensional map estimation apparatus 100 depicted in FIG. 6 includes just one of each sub-component, but in other examples there may be two or more of each sub-component. Furthermore, one three-dimensional map estimation apparatus 100 is illustrated in FIG. 6. In other examples, software may be installed in a plurality of computer apparatuses, and each computer apparatuses may process different part of the software.

The processor 91 is an electronic circuit that operates as a processing circuit including a control apparatus and an arithmetic apparatus for the three-dimensional map estimation apparatus 100. The processor 91 performs an arithmetic process based on data input from each sub-component or the like of the three-dimensional map estimation apparatus 100 and a program. The processor 91 functions to output an arithmetic result and a control signal to each sub-component and the like. Specifically, in this example, the processor 91 controls each component of the three-dimensional map estimation apparatus 100 by executing an operating system (OS) of the three-dimensional map estimation apparatus 100, an application, a control program, and/or the like. The processor 91 is not limited in any particular manner as long as the above-described processing can be performed. The various functional aspects (see FIG. 1) of three-dimensional map estimation apparatus 100 are implemented by the processor 91.

The main storage apparatus 92 stores commands to be performed by the processor 91, various data, control parameters, and the like. Information stored in the main storage apparatus 92 can be directly read or otherwise accessed by the processor 91. The auxiliary storage apparatus 93 is any storage apparatus other than the main storage apparatus 92. In this context, "storage apparatus" refers to any electronic device or component capable of storing electronic information, for example, the storage apparatus may be a memory unit, a hard disk drive, a solid-state drive, or the like. In this context, a memory unit may be a volatile memory or a non-volatile memory, and either or both may be used. Various data may be stored in the three-dimensional map estimation apparatus 100 by either or both of the main storage apparatus 92 or the auxiliary storage apparatus 93.

In another example, when an accelerator is further provided in the three-dimensional map estimation apparatus 100, a storage unit may be provided in a memory in the accelerator.

The network interface 94 is for connecting to communication network 98 by wire or wirelessly. An interface conforming to any existing communication standard may be used as the network interface 94. The network interface 94 may exchange information with an external apparatus 99A and is connected thereto through the communication network 98.

The external apparatus 99A may be, for example, a stereo camera, a motion capture device, an output destination device, an external sensor, an input source device, or the like. In some examples, the external apparatus 99A may have functions of some of the elements described for functional components of the three-dimensional map estimation apparatus 100. Thus, the three-dimensional map estimation apparatus 100 may communicate or receive some of process results through the communication network 98 via a cloud service or the like.

The device interface 95 is an interface such as a Universal Serial Bus (USB) that can be directly connected to an external apparatus 99B. The external apparatus 99B may be an external storage medium or a storage apparatus.

In some examples, external apparatus 99B may be an output apparatus. An output apparatus may be, for example, a display apparatus for displaying an image, an apparatus for outputting voice/sound, or the like. For example, the output apparatus may include a liquid crystal display (LCD), a cathode ray tube (CRT), a plasma display panel (PDP), a speaker, and the like but is not limited thereto. Further, the output apparatus may be an element of an automobile controlled through a controller area network (CAN) or the like.

The external apparatus 99B may instead, or in addition to, be an input apparatus. An input apparatus includes devices such as a keyboard, a mouse, and a touch panel and provides information (e.g., user input) to the three-dimensional map estimation apparatus 100. A signal from the input apparatus (external apparatus 99B) can be output to the processor 91.

In general, functional units and the like of the three-dimensional map estimation apparatus 100 and the obstacle detection apparatus 200 as described in the example embodiments may be implemented by hardware or in software. When implemented in software, processor 91 may be a general purpose central processing unit (CPU), or the like. Software for providing described functions may be provided on a non-transitory computer-readable medium such as a flexible disk, a CD-ROM, a hard-disk drive, a magnetic disk, an optical disk, or the like. The software provided in such a manner may be provided in an executable format, and installable format, or otherwise. Such software may be provided for download or for access via a network. Further, any process performed by software may be implemented by a dedicated circuit such as field programmable gate array (FPGA) or the like. Likewise, combinations of software and dedicated circuits/hardware may be utilized in some examples.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A three-dimensional map estimation apparatus, comprising:
a processor configured to:
select an imaging apparatus from a plurality of imaging apparatuses;
estimate a position and orientation for a moving object on which the selected imaging apparatus is mounted based on images captured by the selected imaging apparatus then output the estimated position and orientation for the moving object as a first position and orientation estimation result;
calculate a second position and orientation estimation result indicating an estimated position and orientation for the moving object, the second position and orientation estimation result being calculated using the first position and orientation estimation result; and
estimate a three-dimensional map for the surroundings of the moving object based on the second position and orientation estimation result.

2. The three-dimensional map estimation apparatus according to claim 1, wherein the processor is further configured to:
convert a change in position and orientation estimated for one imaging apparatus of the plurality of imaging apparatuses into a change in position and orientation of another one of the imaging apparatuses in the plurality of imaging apparatuses based on the second position and orientation estimation result.

3. The three-dimensional map estimation apparatus according to claim 1, wherein the processor is further configured to:
calculate a similarity value for each of a plurality of first position and orientation estimation results that are respectively based on images from different imaging apparatuses in the plurality of imaging apparatus and then select one or more of the first position and orientation estimation results, based on the calculated similarity values, to be used in calculating the second position and orientation estimation result.

4. The three-dimensional map estimation apparatus according to claim 3, wherein the processor is configured to estimate the three-dimensional map for the surroundings of the moving object based on the second position and orientation estimation result and at least one image from an imaging apparatus selected for estimating a first position and orientation estimation result but not selected for calculating the second position and orientation estimation result.

5. The three-dimensional map estimation apparatus according to claim 1, wherein the processor is further configured to:
estimate a position and orientation for the moving object based on sensor information from a sensor on the moving object.

6. The three-dimensional map estimation apparatus according to claim 1, wherein the processor selects the imaging apparatus based on a movement direction of the moving object or a movement speed of the moving object.

7. The three-dimensional map estimation apparatus according to claim 1, wherein the processor is further configured to:
a detect an object in the surroundings of the moving object based on the three-dimensional map.

8. The three-dimensional map estimation apparatus according to claim 1, wherein the second position and orientation estimation result is a weighted average of a plurality of first position and orientation estimation results.

9. The three-dimensional map estimation apparatus according to claim 8, wherein
a weighting coefficient of each of the plurality of first position and orientation estimation results is based on a reliability value for the corresponding imaging apparatus or a reliability value for the first position and orientation estimation result.

10. The three-dimensional map estimation apparatus according to claim 1, wherein the three-dimensional map is estimated using feature points in images acquired at two different times.

11. The three-dimensional map estimation apparatus according to claim 1, wherein the processor estimates the three-dimensional map based on the second position and orientation estimation result and at least one image from an imaging apparatus other than the selected imaging apparatus.

12. An obstacle detection apparatus, comprising:
a three-dimensional map estimation apparatus according to claim 1; and
an obstacle detection unit configured to detect an obstacle by using a three-dimensional map estimated by the three-dimensional map estimation apparatus.

13. A three-dimensional map estimation apparatus, comprising:
an interface connectable to a plurality of cameras;
a processor configured to:
select at least one camera from the plurality of cameras from which to receive, via the interface, images of the surroundings of a moving object;
estimate a position and orientation for the moving object using images from each selected camera in the plurality of cameras and output first position and orientation estimation results based on images from each selected imaging apparatus;
calculate a second position and orientation estimation result indicating an estimated position and orientation for the moving object, the second position and orientation estimation result being calculated using the first position and orientation estimation results; and
estimate three-dimensional maps for the surroundings of the moving object based on the images from each camera in the plurality of cameras and the second position and orientation estimation result.

14. The three-dimensional map estimation apparatus according to claim 13, wherein the second position and orientation estimation result is a weighted average of a plurality of first position and orientation estimation results.

15. The three-dimensional map estimation apparatus according to claim 13, wherein the processor is further configured to:
 a detect an object in the surroundings of the moving object based on at least one of the estimated three-dimensional maps.

16. The three-dimensional map estimation apparatus according to claim 13, wherein
 the processor selects two or more cameras, and
 the second position and orientation estimation result is calculated using less than all of the first position and orientation estimation results.

17. The three-dimensional map estimation apparatus according to claim 13, wherein
 the interface is connectable to a sensor, and
 the processor is further configured to:
  estimate a position and orientation for the moving object using information from the sensor and output a first position and orientation estimation result based on the information from the sensor.

18. A moving object, comprising:
 a plurality of cameras;
 a processor connected to the plurality of cameras and configured to:
  select at least one camera from the plurality of cameras from which to receive images;
  estimate a position and orientation for the moving object using images from each selected camera in the plurality of cameras and output first position and orientation estimation results based on images from each selected imaging apparatus;
  calculate a second position and orientation estimation result indicating an estimated position and orientation for the moving object, the second position and orientation estimation result being calculated using the first position and orientation estimation results; and
  estimate three-dimensional maps for the surroundings of the moving object based on the images from each camera in the plurality of cameras and the second position and orientation estimation result.

19. The moving object according to claim 18, further comprising:
 a sensor connected to the processor, wherein
 the processor is further configured to estimate a position and orientation for the moving object using information from the sensor and output a first position and orientation estimation result based on the information from the sensor.

20. The moving object according to claim 18, wherein the processor is further configured to:
 a detect an object in the surroundings of the moving object based on at least one of the three-dimensional maps.

* * * * *